(12) United States Patent
Shanmugam et al.

(10) Patent No.: US 10,776,508 B2
(45) Date of Patent: Sep. 15, 2020

(54) HOLISTIC AND SECURE RESOURCE PROVISIONING GATEWAY SYSTEM

(71) Applicant: Bank of America Corporation, Charlotte, NC (US)

(72) Inventors: Parthiban T. Shanmugam, Charlotte, NC (US); Prashant Ranjan Srivastava, Charlotte, NC (US); Kamalanathan Jeganathan, Charlotte, NC (US); Krishna C. Yalamanchili, Frisco, TX (US); Durga Prasad Turaga, Murphy, TX (US); Michelle Andrea Boston, Richardson, TX (US)

(73) Assignee: Bank of America Corporation, Charlotte, NC (US)

( * ) Notice: Subject to any disclaimer, the term of this patent is extended or adjusted under 35 U.S.C. 154(b) by 250 days.

(21) Appl. No.: 16/035,077

(22) Filed: Jul. 13, 2018

(65) Prior Publication Data

US 2020/0019721 A1 Jan. 16, 2020

(51) Int. Cl.
*H04L 29/06* (2006.01)
*G06F 21/62* (2013.01)
*H04L 29/08* (2006.01)
*G06F 11/36* (2006.01)
*G06F 16/21* (2019.01)

(52) U.S. Cl.
CPC ...... *G06F 21/6227* (2013.01); *G06F 11/3664* (2013.01); *G06F 16/21* (2019.01); *G06F 21/6254* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 2010/0031354 A1* | 2/2010 | Hudis | G06F 21/55 726/22 |
| 2014/0237620 A1* | 8/2014 | Ukil | G06F 21/60 726/26 |
| 2015/0154407 A1* | 6/2015 | Yi | G06F 21/14 713/194 |
| 2017/0098215 A1* | 4/2017 | Brotsky | G06F 21/6254 |
| 2017/0185800 A1* | 6/2017 | Bentley | G06F 3/0481 |
| 2019/0190890 A1* | 6/2019 | Druker | H04L 63/0421 |
| 2020/0026792 A1* | 1/2020 | Mallya | G06F 16/16 |

* cited by examiner

*Primary Examiner* — Shin-Hon (Eric) Chen
(74) *Attorney, Agent, or Firm* — Michael A. Springs; Moore & Van Allen; Nicholas C. Russell (57) ABSTRACT

Embodiments of the present invention provide a holistic and secure resource provisioning gateway system. In particular, a managing system receives resources from disparate sources like production environments. The resources are divided into multiple resource blocks and each resource block is transmitted to individual servers of a resource gateway network along with packaged code that is configured to cause the individual servers to identify sensitive resource elements and sanitize the sensitive resource elements. A request for a provisioned set of sanitized resources meeting certain application testing requirements is then received, and the set of sanitized resources are generated based on the requirements and transmitted to a testing environment.

20 Claims, 6 Drawing Sheets

HOLISTIC AND SECURE RESOURCE PROVISIONING GATEWAY SYSTEM

BACKGROUND

Utilization of resources derived from production and staging environments is a useful practice for assessing applications within a test environment due to the real-life nature of the derived resources. However, resources derived from lower level environments often contain sensitive resources that are not consistently or adequately sanitized or obfuscated before entering the test environment. Therefore, a holistic and secure resource provisioning gateway system is needed to address the sanitization of resources for data provisioning purposes that maintains the integrity of resource formats.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for providing a holistic and secure resource provisioning gateway. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve receiving a plurality of resources from multiple disparate sources, wherein the plurality of resources comprise resources of multiple resource formats. The system may then divide the plurality of resources into two or more resource blocks and transmit each resource block of the two or more resource blocks to a single server of a resource gateway server network such that each server of the resource gateway server network receives a single resource block of the two or more resource blocks that is considered a respective resource block. The system may then transmit packaged code to each server of the resource gateway server network to process each respective resource block. In some embodiments, this packaged code is configured to cause each server of the resource gateway server network to generate and return a processed respective resource block by identifying sensitive resources in the respective resource block, sanitizing the sensitive resources in the respective resource block, and returning the processed respective resource block. Next, in some embodiments, the system may receive and store each processed respective resource block from each server of the resource gateway server network in a sanitized resource database. Furthermore, the system may receive, from a resource exchange portal, a request for a set of sanitized resources for an application testing environment, wherein the request comprises a required resource volume and one or more required resource types. Finally, in some embodiments, the system may generate, from the sanitized resource database, a provisioned set of resources that comprises the required resource volume and the one or more required resource types, and seed the provisioned set of resources to the application testing environment.

In some embodiments of the system, the step of identifying the sensitive resources comprises identifying a schema associated with a resource file of the respective resource block, and comparing the identified schema to a database of known schema and associated locations of sensitive resources within each known schema to identify locations of the sensitive resources within the schema associated with the resource file of the respective resource block.

Additionally or alternatively, the system's step of identifying the sensitive resources may comprise identifying a pattern associated with a resource element of the respective resource block, wherein the pattern is associated with a known type of sensitive resource, and identifying the resource element of the respective resource block as a sensitive resource.

Furthermore, in some embodiments of the system, the step of sanitizing the sensitive resources comprises scrambling resource elements of the sensitive resources in a randomized manner within individual columns of the sensitive resources.

Additionally or alternatively, the system's step of sanitizing the sensitive resources comprises replacing at least a portion of individual characters of the sensitive resources.

In some embodiments of the system, the step of sanitizing the sensitive resources comprises replacing an entire resource element of the sensitive resources with a randomly generated test resource element that adheres to rules of the replaced entire resource element.

Finally, in some embodiments, the system's step of sanitizing the sensitive resources may comprise adjusting original numerical values of the sensitive resources to values within a predetermined percentage difference from the original numerical values of the sensitive resources.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource" refers to data, information, files, documents, records, and the like that may be analyzed, processed, sanitized, and/or transferred. Resources (e.g., a group of individual resources) may originally be identified, received, or otherwise obtained from a production environment. Each individual resource may comprise a plurality of resource elements (e.g., data points, data field entries, columned data, rowed data, and the like). Each resource element may comprise one or more resource characters (e.g., alphabetical characters, numeric characters, alphanumeric characters, punctuation characters, and the like).

Figure 1:
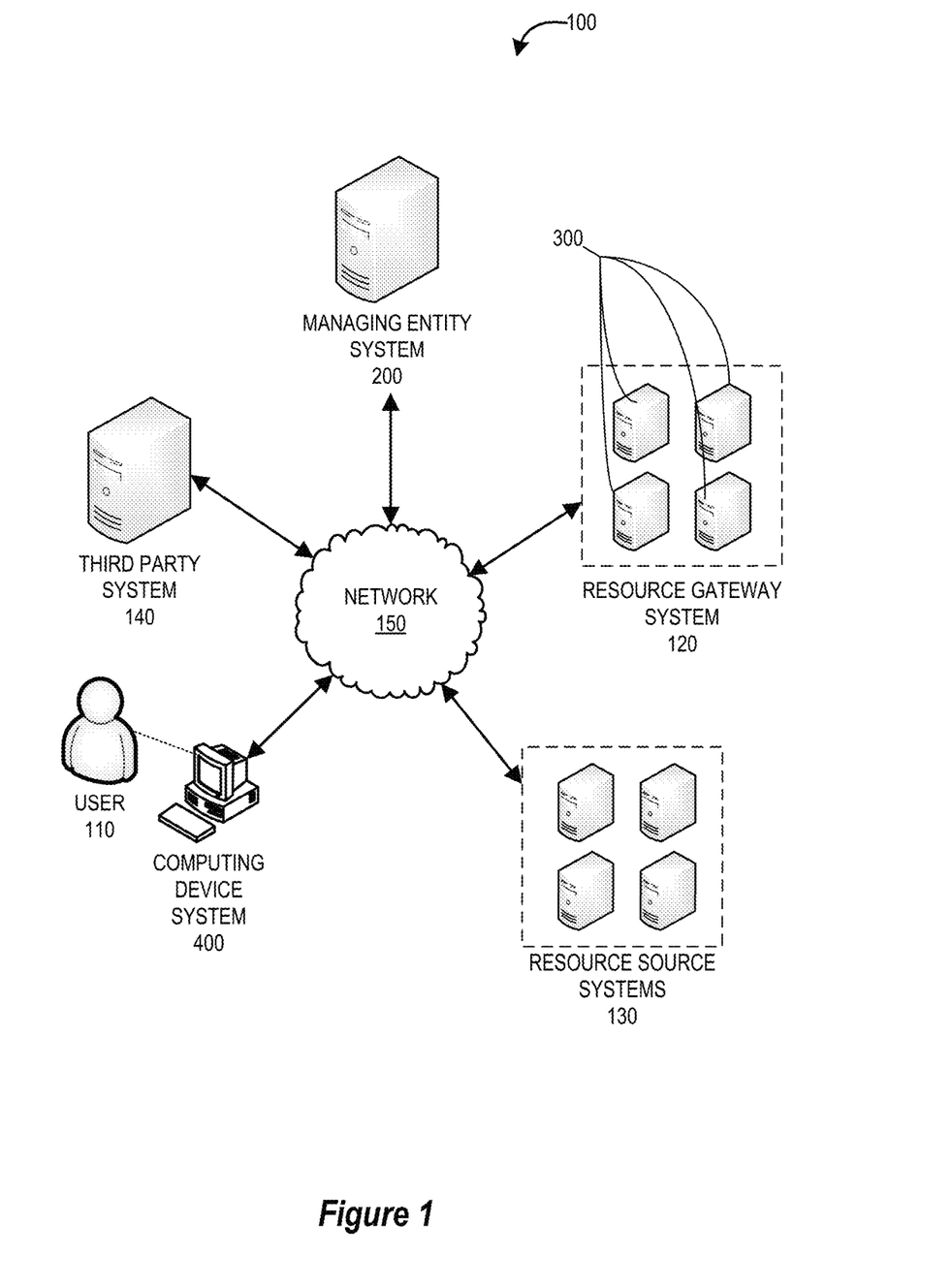
FIG. 1 provides a block diagram illustrating a system environment for providing a holistic and secure resource provisioning gateway, in accordance with an embodiment of the invention.

FIG. 1 provides a block diagram illustrating a system environment 100 for providing a holistic and secure resource provisioning gateway, in accordance with an embodiment of the invention. As illustrated in FIG. 1, the environment 100 includes a managing entity system 200, a resource gateway system 120 comprising individual resource gateway server systems 300, resource source systems 130, a computing device system 400, and one or more third party systems 140. One or more users 110 may be included in the system environment 100, where the users 110 interact with the other entities of the system environment 100 via a user interface of the computing device system 400. In some embodiments, the user(s) 110 of the system environment 100 may be program testers, software testers, programmers, computer science engineers, developers, or other employees employed by, or contractors associated with, the managing entity system 200.

The managing entity system 200, the resource gateway system 120, the resource source systems 130, the computing device system 400, and/or the third party system 140 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The managing entity system 200 may be a system owned or otherwise controlled by a managing entity to perform one or more process steps described herein. In some embodiments, the managing entity is a financial institution. In general, the managing entity system 200 is configured to communicate information or instructions with the resource gateway system 120 (e.g., either by communicating with the resource gateway system 120 in general or by communicating directly with individual resource gateway server systems 300 that comprise the resource gateway system 120), the resource source systems 130, the computing device system 400, and/or the third party system 140 across the network 150.

For example, the managing entity system 200 may receive, extract, or otherwise identify resources (e.g., data) from the resource source systems 130, divide the identified resources into resource batches or blocks, and transmit the resource batches or blocks to resource gateway server systems 300 of the resource gateways system 120. Additionally or alternatively, the managing entity system 200 may be configured to identify or receive requirements of an application testing environment from the computing device system 400 associated with the user 110, generate a provisioned set of processed and/or sanitized resources that meet the requirements of the application testing environment based on resources received from the resource gateway system 120, and seed the provisioned set of resources to the application testing environment associated with the computing device system 400. Of course, the managing entity system 200 may be configured to perform (or instruct other systems to perform) one or more other process steps described herein. The managing entity system 200 is described in more detail with respect to FIG. 2.

The resource gateway system 120 may comprise a network of a plurality of servers (i.e., resource gateway server systems 300) that are configured to solve problems involving massive amounts of data or other resources and/or computations. The resource gateway system 120 is configurable to provide a software framework for distributed storage and processing of large amounts of resources by dividing the large amounts of resources into batches that are manageable by each individual resource gateway server system 300 that run in parallel to efficiently process the resources. The resource gateway system 120 is configurable by the managing entity system 200 and/or the computing device system 400 associated with the user 110, such that the resource gateway system 120 can be structured or designed to perform certain resource processing actions that are desirable or necessary for converting resources from production or staging environments to be usable in testing environments without disclosing any personal, financial, confidential, or other sensitive information that is present in the production or staging environments.

In this way, the resource gateway system 120 may communicate information or instructions with the managing entity system 200, the resource source systems 130, the computing device system 400, and/or the third party system 140 across the network 150. For example, the resource gateway system 120 may receive, from the managing entity system 200 and/or the computing device system 400 associated with the user 110, packaged code that configures each individual resource gateway server system 300 of the resource gateway system 120 to process batches or blocks of resources (e.g., data) in particular ways (e.g., to identify sensitive data in the batches or blocks of resources, to sanitize the identified sensitive data, and the like). The particular ways that the resource gateway system 120 is configured to process the received batches or blocks of resources depends on the makeup and instructions found in the packaged code, and the packaged code can be adjusted over different iterations to provide different results (e.g., to be more strict or less strict with regards to data sanitizing techniques), based on one or more known or desired sanitized data outputs. A sample resource gateway server system 300 of the resource gateway system 120 is described in more detail with respect to FIG. 3.

The computing device system 400 may be a system owned or controlled by the managing entity of the managing entity system 200, the user 110, and/or a third party that specializes in providing, hosting, managing, or otherwise controlling workstations or other computing devices that interact with systems in the system environment 100. As such, the computing device system 400 may be a computing device of the user 110 (e.g., an application or program tester or other developer or tester of applications associated with the managing entity system 200). In general, the computing device system 400 communicates with the user 110 via a user interface of the computing device system 400, and in turn is configured to communicate information or instructions with the managing entity system 200, the resource gateway system 120 (including individual resource gateway server systems 300), the resource source systems 130, and/or the third party system 140 across the network 150.

For example, the computing device system 400 may receive user input from the user 110 (e.g., via a resource exchange portal application stored on the computing device system 400 and/or accessible by the user 110 via the computing device system 400) comprising testing environment requirements (e.g., desired or maximum resource volumes and/or resource types), and the computing device system 400 may be configured to transmit the testing environment requirements to the managing entity system 200 and/or the resource gateway system 120. Additionally or alternatively, the computing device system 400 may be configured to receive sanitized provisioned resources from the managing entity system 200 and/or the resource gateway system 120 and apply the sanitized provisioned resources to a testing environment that the user 110 can access and manipulate through interactions with the user interface of the computing device system 400. The computing device system 400 is described in more detail with respect to FIG. 4.

Resource source systems 130 may comprise a plurality of databases, production environments, staging environments, disaster recovery environments, and the like, where data, information, and other resources that are used or identified in real-world applications are collected. In some embodiments, at least a portion of the resource source systems 130 comprise lower level environments where confidential, non-public, or otherwise sensitive information is not consistently sanitized or obfuscated. Additionally, the individual databases and/or environments may be disparate and comprise data that are in different formats from each other. The managing entity system 200 and/or a separate system may be configured to aggregate, monitor, trawl, or otherwise collect resources from each of the resource source systems 130 into a single database. The individual resource source systems 130 are defined and described in more detail with respect to the resource sources 502 element of FIG. 5.

The third party system 140 may be any system that provides additional resources (e.g., data or other information from sources that are not directly related to the managing entity system 200), aides in the functionality of one or more systems in the system environment 100, provides (or compares) regulatory or business standards to data or other resources in the system environment 100, and/or the like.

Figure 2:
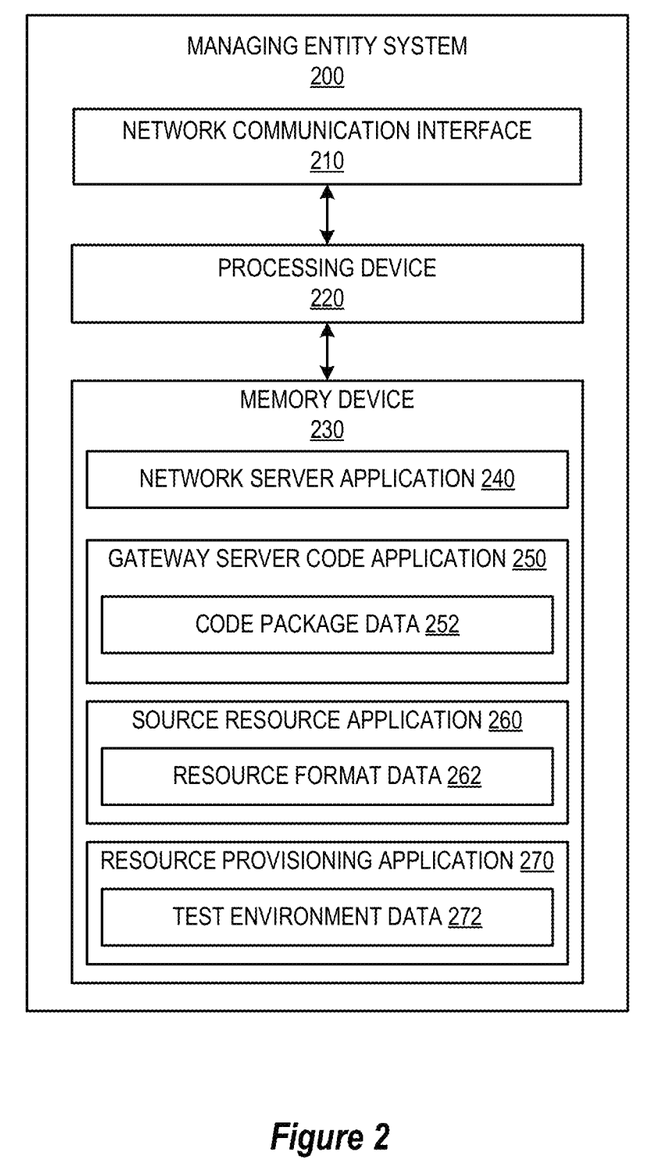
FIG. 2 provides a block diagram illustrating the managing entity system 200 of FIG. 1, in accordance with an embodiment of the invention.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a gateway server code application 250 which includes code package data 252, a source resource application 260 that includes resource format data 262, and resource provisioning application 270 which includes test environment data 272. The computer-executable program code of the network server application 240, the gateway server code application 250, the source resource application 260, and/or the resource provisioning application 270 may instruct the processing device 220 to perform certain logic, data-processing, and data-storing functions of the managing entity system 200 described herein, as well as communication functions of the managing entity system 200.

The network server application 240, the gateway server code application 250, the source resource application 260, and the resource provisioning application 270 are configured to invoke or use the code package data 252, the resource format data 262, the test environment data 272, and the like when communicating through the network communication interface 210 with the resource gateway system 120, the resource source systems 130, the computing device system 400, and/or the third party system 140 to perform one or more process steps described herein. In some embodiments, the managing entity system 200 performs, instructs, or otherwise controls every process step described with respect to FIG. 5 and/or FIG. 6.

Figure 3:
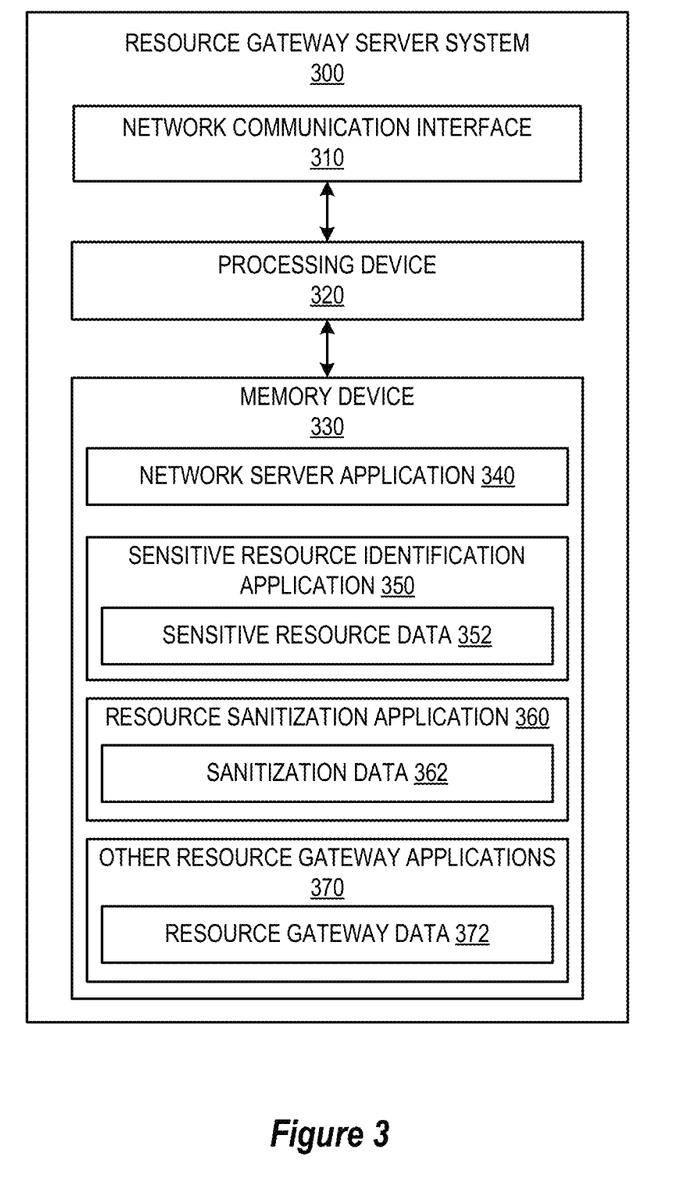
FIG. 3 provides a block diagram illustrating a sample resource gateway server system 300 of FIG. 1, in accordance with an embodiment of the invention.

FIG. 3 provides a block diagram illustrating a sample resource gateway sever system 300 in greater detail, in accordance with embodiments of the invention. As mentioned above, the resource gateway system 120 of FIG. 1 may comprise a plurality of individual resource gateway server systems 300, which may comprise a physical server, a virtual server, or any other computing device that is specifically configured to perform the resource processing functions described herein. For example, the resource gateway system 120 may utilize a collection of software utilities that facilitate using a network of the plurality of resource gateway server systems 300 to more efficiently process large amounts of data, information, or other resources.

The resource gateway system 120 may provide a software framework for storing data, running data or resource processing applications, and the like on the plurality of hardware devices associated with the resource gateway server systems 300. The resource gateway system 120 in general, and the resource gateway server systems 300 individually, may be configured to receive packaged code that informs the software framework on the particular mechanics or instructions for processing one or more data or resource packets or blocks. This structure of the resource gateway system 120 allows the resource gateway system 120 to quickly process resources, minimize disruptions in application or resource processing (e.g., by redirecting the portion of resources that are at a downed server to at least one other server), provide a flexible and adjustable set of functionality for how resources are processed, and a scalability that is capable of efficiently processing different amounts of resources. In some embodiments, the resource gateway system 120, and the individual resource gateway server systems 300 that comprise the resource gateway system 120 may, be a component of, comprise, or otherwise be associated with the Apache Hadoop® computer software utilities. For example, the software framework of the resource gateway system 120 that is used on each resource gateway server system 300 may comprise the Apache Hadoop® software utilities that include, but are not limited to, modules like the Hadoop MapReduce, Hadoop YARN, Hadoop Distributed File System, Hadoop Common, Hadoop SQOOP, Hadoop SPARK, Hadoop NDM, Hadoop SFTP, Hadoop Hive Tables, Hadoop Staging, and the like.

As illustrated in FIG. 3, in one embodiment of the invention, the resource gateway server system 300 includes one or more processing devices 320 operatively coupled to a network communication interface 310 and a memory device 330. In certain embodiments, the resource gateway server system 300 is operated by a first entity, such as a financial institution, while in other embodiments, the resource gateway server system 300 is operated by an entity other than a financial institution. In some embodiments, each resource gateway server system 300 is owned or operated by the managing entity of the managing entity system 200. Furthermore, in some embodiments, at least a portion of each resource gateway server system 300 (and the resource gateway system 120 in general), is a component of the managing entity system 200.

It should be understood that the memory device 330 may include one or more databases or other data structures/repositories. The memory device 330 also includes computer-executable program code that instructs the processing device 320 to operate the network communication interface 310 to perform certain communication functions of the resource gateway server system 300 described herein. For example, in one embodiment of the resource gateway server system 300, the memory device 330 includes, but is not limited to, a network server application 340, a sensitive resource identification application 350 which includes sensitive resource data 352, a resource sanitization application 360 which includes sanitization data 362, other resource gateway applications 370 that include resource gateway data 372, and other computer-executable instructions or other data. The computer-executable program code of the network server application 340, the sensitive resource identification application 350, the resource sanitization application 360, and/or the other resource gateway applications 370 may instruct the processing device 320 to perform certain logic, data-processing, and data-storing functions of the resource gateway server system 300 described herein, as well as communication functions of the resource gateway server system 300.

The network server application 340, the sensitive resource identification application 350, the resource sanitization application 360, and the other resource gateway applications 370 are configured to invoke or use the sensitive resource data 352, the sanitization data 362, the resource gateway data 372, and the like when communicating through the network communication interface 310 with the managing entity system 200, the resource source system 130, other resource gateway server systems 300 of the resource gateway system 120, the computing device system 400, and/or the third party system 140.

Figure 4:
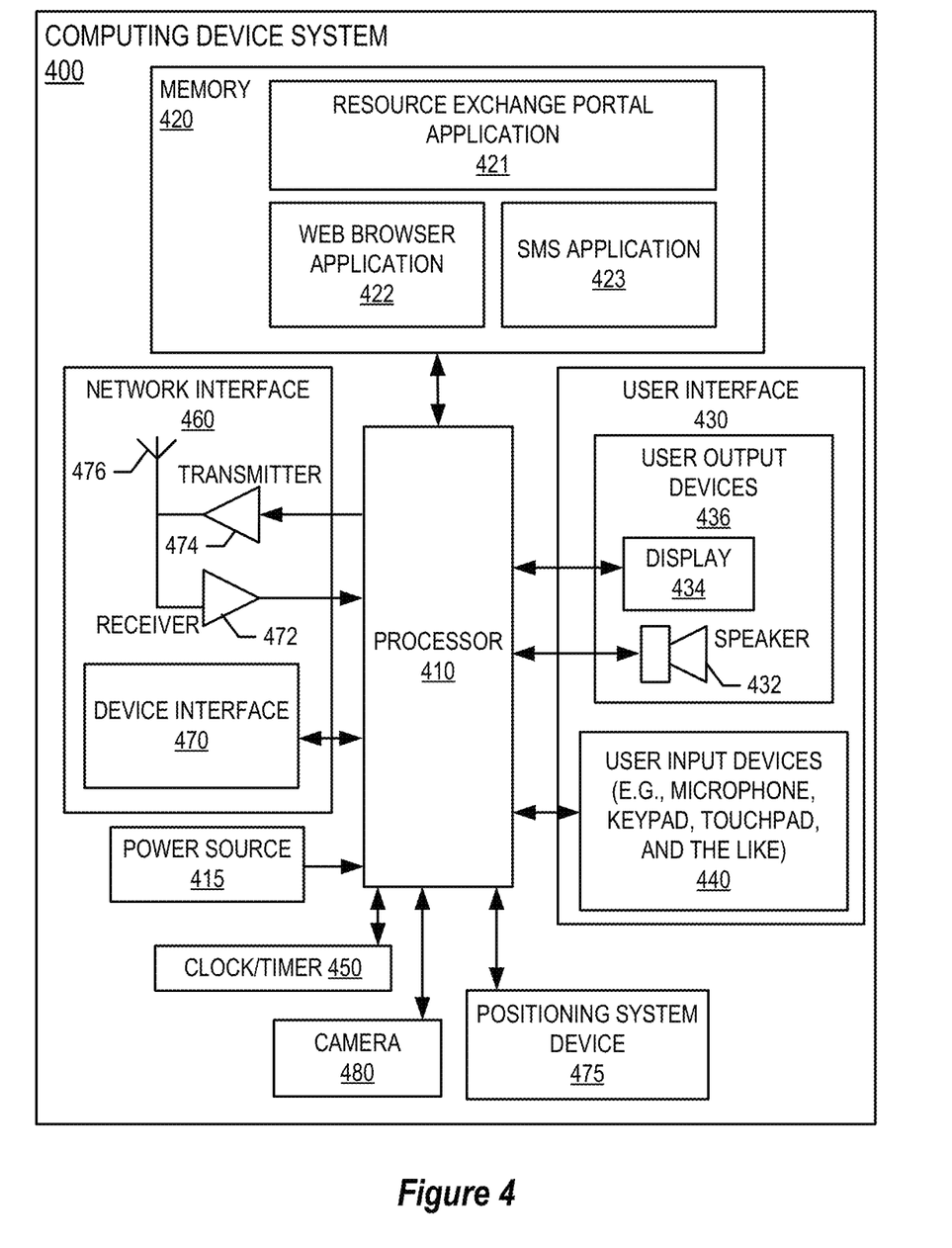
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. In one embodiment of the invention, the computing device system 400 is a workstation of a software or application tester user (e.g., the user 110) that is an employee, contractor, or otherwise affiliated with the managing entity of the managing entity system 200. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 434 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422 and/or a resource exchange portal application 421 (or any other application provided by the managing entity system 200). These applications also typically instructions to a graphical user interface (GUI) on the display 434 that allows the user 110 to interact with the computing device system 400, the managing entity system 200, and/or other devices or systems. In one embodiment of the invention, when the user 110 decides to enroll in a resource exchange portal application 421 program, the user 110 downloads, is assigned, or otherwise obtains the resource exchange portal application 421 from the managing entity system 200, or from a distinct application server (e.g., from the resource gateway system 120). In other embodiments of the invention, the user 110 interacts with the managing entity system 200 or the resource gateway system 120 via the web browser application 422 in addition to, or instead of, the resource exchange portal application 421. For example, the managing entity system 200 may provide an online web portal that is accessible by the user 110, via the user interface 430, through the web browser application 422.

The memory 420 of the computing device system 400 may comprise a Short Message Service (SMS) application 423 configured to send, receive, and store data, information, communications, alerts, and the like via the wireless telephone network 152.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
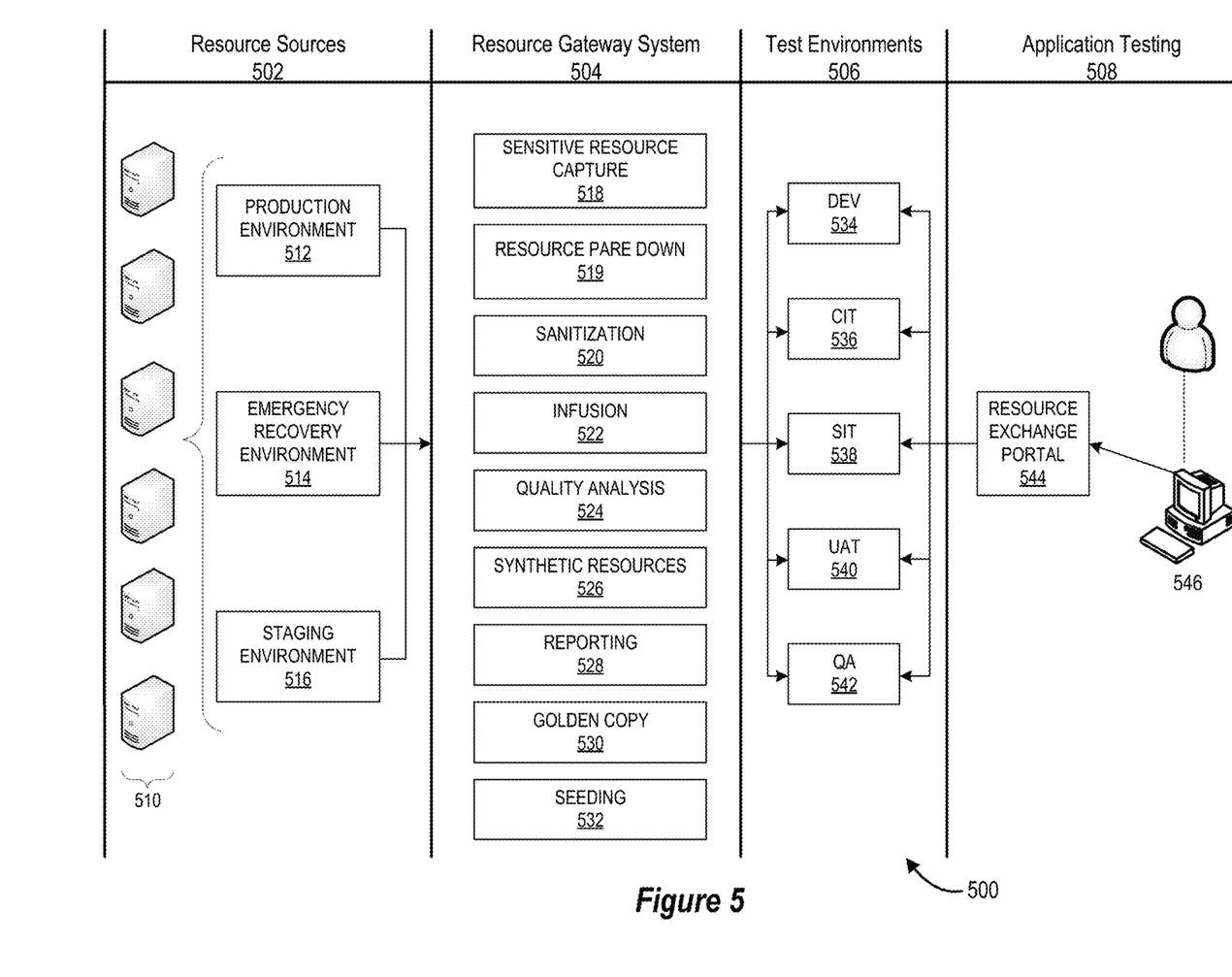
FIG. 5 provides a flowchart illustrating a process for providing a holistic and secure resource provisioning gateway, in accordance with an embodiment of the invention.

FIG. 5 provides a flowchart illustrating a process 500 for providing a holistic and secure resource provisioning gateway, in accordance with an embodiment of the invention. As shown in FIG. 500, the process 500 involves or includes resource sources 502, a resource gateway system 504, test environments 506, and an application testing 508. The process 500 begins with the resource sources 502, where data, information, or other resources are gathered from a plurality of resource source systems 510. As used herein, the term "resource" may refer to data, information, statistics, documents, files, numbers, records, or any other information that can be communicated, processed, reviewed, analyzed, and the like.

These resource source systems 510 can include networks, applications, environments, and other systems where data or information is gathered, generated, or otherwise obtained or utilized. The resources from different systems within the resource source systems 510 can have different formatting, rules, schematics, lengths, sizes, and the like. As such, one set of resources, as they are obtained directly from the resource source systems 510, may be incompatible with another set of resources for data processing purposes without subsequent format adjustments. Therefore the types of resource source systems 510 can comprise or be associated with a plurality of different database types, server types, information types, programming language types, and the like.

The resources gathered from the resource source systems 510 may, in some embodiments, be taken or received from production environments 512, emergency recovery environments 514, and/or staging environments 516. The resource source systems 510 from which the resources are ingested may include midrange, mainframe, and No SQL database servers. A managing entity system and/or the resource gateway system 504 may actively extract resources (e.g., data from production environments 512) from one or more of the resource source systems 510. Additionally or alternatively, at least some of the individual resource source systems 510 may actively or passively transmit its resources to the managing entity system and/or the resource gateway system 504. The managing entity system 200 and/or the resource gateway system 504 may utilize SQOOP, SPARK, NDM, SFTP or other network transfer utilities to move the resources in to (and subsequently out of) the resource gateway system 504.

Because data and information associated with these production environments 512, emergency recovery environments 514, and/or staging environments 516 typically include personal identification information, financial account information, and other sensitive data, the resources gathered from the resource source systems 510 will need to be processed before they can be utilized for testing purposes. Therefore, the resource gateway system 504 may perform certain resource processing (e.g., data processing) steps on the received resources. In some embodiments, the resource gateway system is specially and particularly configured to execute a specific set of resource processing steps. In this way, the resource gateway system 504 may be a set of special purpose computers that are responsible only for processing the received resources in a particular manner as efficiently and accurately as possible. The specifics regarding which processing steps to perform on the received resources may be automatically identified by the resource gateway system 504. Additionally or alternatively, the specifics regarding which processing steps to perform on the received resources may be designated by a managing entity through the implementation of packaged code that instructs the resource gateway system 504 on which processing steps to perform.

Because the resource acquisition process may be structured to intake large quantities of production data, staging data, or the like (e.g., all production data of an enterprise for a given period of time, all production data of a line of business for a given period of time, all production data of lines of business that relate to one or more applications that will be tested over a given period of time, or the like), the amount of resources that will be received may be too large for providing to the testing environment. Additionally or alternatively, it may be unnecessary to process (e.g., sanitize) the total amount of received resources, particularly if a maximum or desired amount of resources is already known based on the application(s) that will be tested. Therefore, in some embodiments, the system may pare down, or subset, the total amount of resources that have been collected to a smaller amount of resources that are known to be desirable or necessary for provisioning to the testing environment. The system may receive a request for testing data or other testing resources from the resource exchange portal 544, where the request includes a desired or required volume of resources, including specified volumes of resources for one or more specified resource types, such that the system may automatically pare down the received resources from the resource sources 502 to meet the requested resource amounts and resource types. In other embodiments, the resource gateway system 504 may perform a resource pare down 519 step in addition to, or instead of, this described pare down or sub-set step to reduce the volume of resources that will be processed and/or made available to the test environment database(s).

In some embodiments, at least a portion of the resource gateway system 504 may be encrypted, such that the resources received from the resource sources 502 are encrypted as they are received by the resource gateway system 504, thereby providing an additional layer of information security for the received resources that typically include sensitive information.

As shown in FIG. 5 with respect to the resource gateway system 504, example resource processing steps include, but are not limited to, sensitive resource capture 518, resource pare down 519, sensitive resource sanitization 520, infusion 522, quality analysis 524, synthetic resources 526, reporting 528, golden copy 530, and seeding 532.

The resource processing step of sensitive resource capture 518 may be performed by the resource gateway system 504 to identify sensitive data, information, or other resources based on metadata, sample data, known schema, identified schema, and the like. The resource gateway system 504 may perform sensitive resource discovery to thoroughly analyze the entire metadata of resource data as well as data, information, or other resources from the received resources which give a holistic view on resource sanitation needs for one or more application testing environments.

In some embodiments, the resource gateway system 504 may be configured to execute the sensitive resource capture 518 step to identify a schema associated with a resource file of the respective resource block and then compare the identified schema to a database of known schema and associated locations of sensitive resources within each known schema to identify locations of the sensitive resources within the schema associated with the resource file of the respective resource block. In other embodiments, the sensitive resource capture 518 technique may comprise identifying a pattern associated with a resource element of the respective resource block, wherein the pattern is associated with a known type of sensitive resource. In such embodiments, the resource gateway system 504 may then identify or label the resource element of the respective resource block as a sensitive resource.

Sensitive resource capture 518 may also include complete sensitive resource describing to identify, define, record, index, or otherwise characterize each individual identified sensitive resource. The resource gateway system 504 may perform the resource describing functions of the sensitive resource capture 518 processing step by holistically analyzing requirements, rules, problematic areas, and the like of potential or known application testing environments or applications that will be analyzed in the testing environments to find anomalies and/or patterns in the received resources (including metadata) to identify when a resource, a resource element, or a combination of resource characters should be described as comprising one or more particular sensitive resource characteristics. These sensitive resource characteristics can later be used by the resource gateway system 504 in subsequent resource processing steps, where the specific processing step depends on the characteristics of the sensitive resources. In some embodiments, the sensitive resource capture 518 processing step and/or one or more resource describing steps may be configured to capture, identify, describe, or otherwise characterize certain resource elements are sensitive resources in the same manner as those techniques described in U.S. patent application Ser. No. 16/035,345 entitled "System for Monitoring Lower Level Environment for Unsanitized Data," which is filed concurrently to this patent application.

As noted above, the resource gateway system 504 may be configured to apply a resource pare down 519 processing step to the resource data to reduce the amount of resources that will ultimately be provided to the testing environment (e.g., stored in testing environment databases or fed to applications operating in a testing environment). To pare down or subset the received resources, the resource gateway system 504 may identify a predetermined volume of one or more resource types for a given application that is known to be associated with the testing environment. In other embodiments, the resource gateway system 504 may receive a request for testing data or resources (e.g., from the resource exchange portal 544) that includes a reference to a particular application that is associated with predetermined volumes of one or more resource types, or the request may include a user input of a required resource volume or required resource volumes for one or more required resource types. The resource gateway system 504 will then identify resource elements within the total amount of resources (or the amount that has already been processed through block 518) that meet the requested or required resource types, identify the requested or required volume(s) for those resource types, and delete or otherwise release the other resource elements to leave only those requested or required resource types and amounts.

Once sensitive resources (e.g., sensitive resource elements and/or characters identified and/or described during the sensitive resource capture 518 processing step) have been identified, and once the resource pare down 519 processing step has occurred (if needed), the resource gateway system 504 may additionally be configured to conduct a resource sanitization 520 processing step to remove, alter, obfuscate, shuffle, mask, or otherwise sanitize the identified sensitive resources. Again, because the resources being processed are intended to be used within an application testing environment where non-public, private, financial, or otherwise sensitive data or information should not be made available, the resource gateway system 504 will need to sanitize any data, information, or other resources that contain sensitive elements. The resource gateway system 504 may utilize one or more of a plurality of available resource sanitization 520 steps to sanitize the sensitive resources. These available resource sanitization 520 steps may cover different scales of robustness, effectiveness, and the like, and therefore can be chosen (e.g., by the managing entity system 200 when generating the packaged code that instructs the resource gateway system 504 on how to process the resources) based on the type of sensitive resource, the severity of each sensitive resource, the potential or known testing environment in which the resources being processed can be subsequently transmitted to, and/or the potential or known program application that will be tested using the resources being processed.

One example of the plurality of available resource sanitization 520 steps or techniques that the resource gateway system 504 may implement comprises resource shuffling, where resource elements within a file or document of a resource are scrambled in a randomized manner within one or more individual columns of the file or document of the resource. In this way, a translation or reference file is created that maps shuffled information to a standard key (e.g., a customer number, account number, and the like). Shuffling across components representing a sensitive resource element (e.g., personal information like names or addresses) ensures that the resultant output is scrambled across multiple sub elements at the same time, which further adjusts and secures the rows or records that constituted sensitive resources in their original composition. Example sensitive resource types where shuffling is particularly useful include, but are not limited to, personal names, business names, personal addresses, business addresses, and the like. By shuffling resource elements across individual columns, the resource gateway system 504 causes a complete disassociation of the actual relationships of resource elements across rows or record sets, such that any relational combination(s) of resource elements can no longer recreate an original set of records.

Another example of the plurality of available resource sanitization 520 steps or techniques that the resource gateway system 504 may implement comprises one or more masking steps that replace at least a portion (e.g., one third of the characters, one half of the characters, five of the characters, the first four characters, the last five characters, or the like) of the original characters that make up a sensitive resource. The replacement character(s) may be random characters (e.g., numbers, letters, capitalized letters, lowercase letters, symbols, punctuation marks, and/or the like). The processed resource, once masked, (e.g., the "residual resource") can no longer be used to identify the original information, and cannot be reverse engineered to recover the original resource value or composition. Example sensitive resource types where masking is particularly useful include, but are not limited to, social security numbers, personal identification numbers, phone numbers, email addresses, government-issued identification numbers, authentication information, dates of birth, and the like.

Furthermore, another example of the plurality of available resource sanitization 520 steps or techniques that the resource gateway system 504 may implement can comprise a substitution, or partial substitution step. Using substitution, the resource gateway system 504 replaces the entire value of the resource element with a randomly (or semi-randomly) generated test value. The randomly generated test value may be constructed by applying certain rules associated with the resource type of the sensitive resource, or may be obtained by generating a substitute resource value that is known to be designate for testing purposes. As such, the resource gateway system 504 may obtain (e.g., from the managing entity system 200) a block of numbers, letters, or other characters from a production pool and designate these characters as test for reuse. Additionally or alternatively, the resource gateway system 504 may maintain a repository of purged production data or other resource values that will not be reused in a production environment, and use these same purged resources (picked at random) to replace actual production values. Examples of sensitive resource types where substitution is particularly useful includes credit card numbers, debit card numbers, account numbers, and the like.

In embodiments where the resource gateway system 504 executes a partial substitution, only a specified set of the resource characters are replaced by randomly generated resource values. For example, if an ultimate goal is to test an application for processing account number information, and the account numbers have an introductory fixed set of characters that reference a managing financial institution, routing information, account types, and the like that are useful or even vital to the testing of the program, the resource gateway system 504 may leave the introductory fixed set of characters unaltered and only substitute the remaining characters of the account number to sanitize the sensitive financial information of the account owner.

Another example of the plurality of available resource sanitization 520 steps or techniques that the resource gateway system 504 may implement comprises a number variance adjustment where original numerical values of the sensitive resources are adjusted to values within a predetermined percentage difference from the original values. For example, the resource gateway system 504 may identify an original value of a resource element and randomly select or generate a numerical value within a predetermined distance from the original value (e.g., within twenty percent, within five thousand units, within ten percent and three hundred units, and the like), and replace the original value with the selected and/or generated numerical value. In this way, the resource gateway system 504, as instructed by the managing entity system 200, is able to alter sensitive information like account amount information, duration of life information, sales information, and the like to new values that will provide similar values that are usable for application testing, but that are altered enough to avoid providing sensitive information to a testing environment.

In some embodiments, the identified sensitive resources cannot be easily adjusted or sanitized. In such embodiments, the identified sensitive resource elements may be removed completely from the sensitive resource.

The resource gateway system 504 may be receiving resources from multiple resource sources 502, and/or may be receiving multiple resource elements from a single resource source 502 that comprise the same or a related resource value or identity (e.g., a name, an identification number, a phone number, an account number, or the like that may be included in multiple instances within a single production environment 512 and/or may be found in multiple production environment 512 databases or data feeds). Therefore, the resource sanitization 520 steps may, in some embodiments, be conducted in a deterministic fashion so as to maintain the integrity, format and context of the data, information, or other resources pulled from the production environment 512 or any other resource source 502.

For example, the sanitization 520 step may be configured to replace an identified sensitive resource of a first name (i.e., one name, not necessarily a given name or forename) with the same second name, regardless of the application from which the first name resource element was received from, which application this name resource element (once processed) will be transferred to, or the like. Likewise, the resource gateway system 504 may be configured to perform the same alterations or replacements to identified account numbers, such that a first account number is always adjusted to the second account number by the sanitization 520 step. In this way, the resource gateway system 504 removes any sensitive data by replacing a real name, account number, or the like, with a non-real name, account number, or the like, without de-linking or disassociating connected references, and while still maintaining identical or similar resource values or names across different resource types, different applications, and different testing environments. This retention of context, in addition to maintaining resource formats from the production environment 512 or other resource sources 502 allows the testing environment to prepare for the resource linking, formatting, and other contextual matters that the tested applications will eventually face when executing in the production environment, without disclosing or unintentionally propagating sensitive resources or other confidential or personal information.

Of course, these different types of resource sanitization 520 processing steps can be used individually or in conjunction to sanitize all different types of sensitive resources identified by the resource gateway system 504. As such, one or more particular resource sanitization 520 techniques can be applied to each known sensitive resource type, depending on the sensitive resource type and/or sensitive characteristic. In some embodiments, the resource sanitization 520 techniques may be the same as or substantially similar to the sanitization techniques described in U.S. patent application Ser. No. 16/035,162 entitled "System for Provisioning Validated Sanitized Data for Application Development," which is filed concurrently to this patent application.

As noted above, the resource gateway system 504 may be configured to perform one or more additional resource processing steps to the resources, either prior to sensitive resources being sanitized or after the sensitive resources have been sanitized, including, but not limited to, infusion 522, quality analysis 524, synthetic resources 526, reporting 528, golden copy 530, and/or seeding 532 processes. The golden copy 530 process may be executed by one or more resource gateway systems 504 to compile sanitized resources in one or more secure databases such that a complete set of sanitized resources is in a single location or multiple accessible locations for future processing. The seeding 532 step may be performed to transmit the sanitized resources to a golden copy database and/or to servers configured to establish a testing environment.

For the synthetic resources 526 processing step, the resource gateway system 504 may be configured to receive metadata associated with the received resource elements, and based off of the metadata (e.g., a determination of resource type, a determination of resource size, a determination of resource origination or subsequent edits, time-based characteristics of the resource element, or the like) will automatically generate resource elements based on known rules and conditions for generating test data that does not create or reveal sensitive resource elements (e.g., sanitized resource elements). This synthetic resources 526 processing step may be performed by the resource gateway system 504 instead of other steps like the sanitization 520 step, such resource elements identified as sensitive by the sensitive resource capture 518 step are only processed through the synthetic resources 526 processing step.

In other embodiments, the resource gateway system 504 may skip all other steps associated with sensitive resource capture 518 and sanitization 520 and instead make the received resources ready for use in the testing environment after generating synthetic resource elements using only this described synthetic resources 526 processing step to all received data and information (i.e., resources). In other embodiments, a portion of the received resource elements (e.g., resources received from a particular resource source 502, associated with a particular application, of a particular resource type, or the like, is processed using only this synthetic resources 526 processing step while the remainder of the received resources undergo other steps like sanitization 520.

Other possible processing steps that may be executed by the resource gateway system 504 may comprise data refresh (e.g., metadata refresh), data reservation (e.g., data provisioning to identify absolute quantities of resources to be provided for a particular test environment at a future point in time), and the like.

Once each resource gateway system 504 has identified sensitive resources and sanitized the sensitive resources, the resource gateway systems 504 may return the processed respective resourced data (e.g., a processed resource block) to the managing entity system 200 that stores the processed respective resources in a sanitized resource database (e.g., a new database generated by the managing entity system 200 and/or a golden copy database).

Next, the computing device system 546 receives a user input from a user regarding either an application that the user would like to test or a set of parameters for data that the user would like to use to test an application. A resource exchange portal 544 may facilitate the user input via a user interface of the computing device system 546. If the user did not input particular parameters for data to be used to test an application, the resource exchange portal 544 may determine an application type, a type of processing that user would like to test with the application, data that is compatible with the application, amounts of data that are compatible with the application, and the like.

In general, the resource exchange portal 544 receives or determines at least one or more required resource types that the application will need to perform a useful test, a resource volume (i.e., an amount of resources, including amounts for each type of resource that the application will need to be tested), and a requested or required test environments 506 for the application. Next, the resource exchange portal 544. Next, the resource exchange portal 544 will identify a set of sanitized resources from the golden copy database or another sanitized resource database or other repository and generate a provisioned set of resources that comprises the required resource volume and the one or more required resource types. The resource exchange portal 544 will then seed or otherwise transmit the provisioned set of resources to the requested or required test environments 506.

As shown in FIG. 5, the test environments 506 may comprise a development ("DEV") environment 534, a component integration testing ("CIT") environment 536, a system integration testing ("SIT") environment 538, a user acceptance testing ("UAT") environment 540, and/or a quality assurance ("QA") environment.

Figure 6:
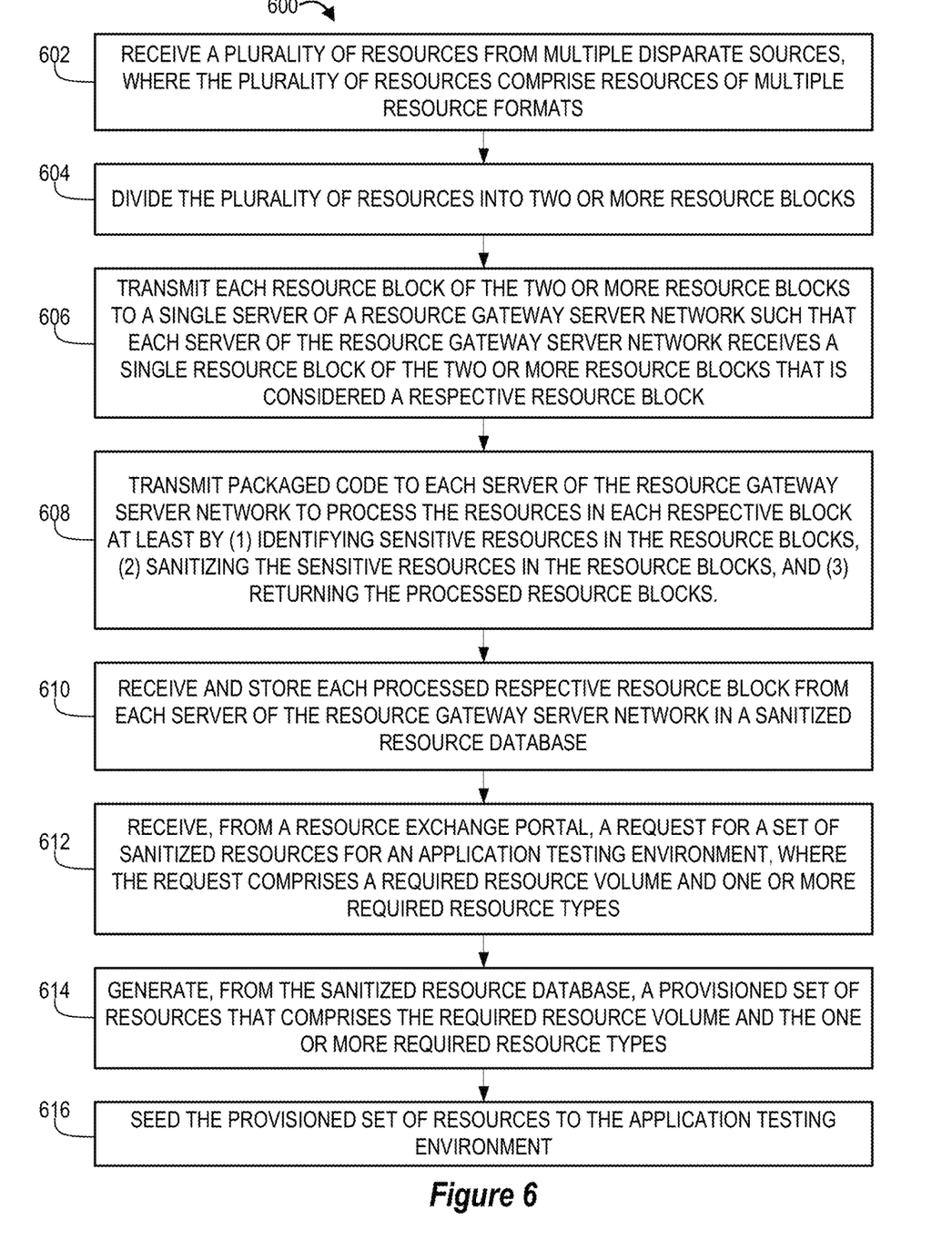
FIG. 6 provides a flowchart illustrating a process for providing a holistic and secure resource provisioning gateway, in accordance with embodiments of the invention.

Referring now to FIG. 6, a flowchart is provided to illustrate one embodiment of a process 600 for providing a holistic and secure resource provisioning gateway, in accordance with embodiments of the invention. This process 600 may be executed using a managing entity system (e.g., the managing entity system 200) that either performs each step directly or instructs one or more other systems to perform certain steps described herein.

In some embodiments, the process 600 may include block 602, where the system receives a plurality of resources from multiple disparate sources, where the plurality of resources comprise resources of multiple resource formats. As these resources may comprise real-world data or other information, the received resources likely comprise non-public, financial, personal, or other sensitive resources. The remaining steps in this process 600 are therefore configured to identify the sensitive resources (and more specifically the sensitive resource elements within each individual resource), sanitize the sensitive resources, generate a set of provisioned sanitized resources that can be safely used for a testing environment, and transmit the set of provisioned sanitized resources to the testing environment for the testing of a software application.

In some embodiments, the process 600 includes block 604, where the system divides the plurality of resources into two or more resource blocks. By breaking the plurality of resources into multiple resource blocks, the system is able to distribute processing requirements across a plurality of multiple processing devices (e.g., servers, research gateway servers, and the like).

Additionally, in some embodiments, the process 600 includes block 606, where the system transmits each resource block of the two or more resource blocks to a single server of a resource gateway server network such that each server of the resource gateway server network receives a single resource block of the two or more resource blocks that is considered a respective resource block. As noted above, by dividing the processing requirements for each resource gateway server, the system is able to process data more efficiently, more quickly, and in specialized manners.

The process 600 may also include block 608, where the system transmits a packaged code to each server of the resource gateway server network to process the resources in each respective resource block at least by (1) identifying sensitive resources in the resource blocks, (2) sanitizing the sensitive resources in the resource blocks, and (3) returning the processed resource blocks.

The packaged code configured to cause the servers of the resource gateway server network to process each respective resource block by identifying sensitive resources in the resource blocks may be specifically configured to cause the server(s) to identify a schema associated with a resource file of the respective resource block and then compare the identified schema to a database of known schema and associated locations of sensitive resources within each known schema to identify locations of the sensitive resources within the schema associated with the resource file of the respective resource block. The step of identifying sensitive resources in the resource blocks may be executed using the same technique(s) described with respect to the sensitive resource capture 518 block of FIG. 5.

Additionally or alternatively, the packaged code may be configured to cause the resource gateway server network to identify the sensitive resources may comprise code configured to cause the server(s) to identify a pattern associated with a resource element of the respective resource block, where the pattern is associated with a known type of sensitive resource. In such embodiments, the packaged code may then cause the server(s) to identify the resource element of the respective resource block as a sensitive resource.

At least a portion of the packaged code configured to cause the resource gateway server network to sanitize the identified sensitive resources may be particularly configured to shuffle the sensitive resources by scrambling resource elements of the resource sources in a randomized manner within individual columns of the sensitive resources.

Additionally or alternatively, at least a portion of the packaged code configured to cause the server(s) to sanitize the identified sensitive resources may be specifically configured to mask the sensitive resources by replacing at least a portion (e.g., at least a third of the resource characters per resource element) of individual characters of the sensitive resources.

In some embodiments, at least a portion of the packaged code configured to cause the server(s) to sanitize the identified sensitive resources may be particularly configured to substitute sensitive resources by replacing entire resource elements of the sensitive resources with randomly (or semi-randomly) generated test resource elements that adhere to certain rules of the replaced entire resource element.

At least a portion of the packaged code configured to cause the resource gateway server network to sanitize the identified sensitive resources may be specifically configured to cause the server(s) to implement numeric and/or date variance for certain numerical and/or date resource elements. In such embodiments, this portion of the packaged code may be configured to cause the server(s) to adjust original numerical values (i.e., non-sanitized elements taken directly from the resource source systems) to values that are within a predetermined percentage difference (e.g., plus or minus two percent, plus or minus ten percent, or the like) or numerical difference (e.g., plus or minus one week of a calendar, plus or minus one hour, plus or minus one thousand, or the like) from the original numerical values of the sensitive resources.

The step of sanitizing the sensitive resources in the resource blocks may be executed using the same technique(s) described with respect to the sanitization 520 block of FIG. 5.

In addition to the processing steps referenced in block 608, the packaged code may comprise one or more additional processing steps that instruct the resource gateway servers to perform resource infusion, resource quality analysis, synthetic resource steps, reporting steps, golden copy aggregation steps, and/or seeding steps.

In some embodiments, the process 600 includes block 610, where the system receives and stores each processed respective resource block from each server of the resource gateway server network in a sanitized resource database. This sanitized resource database may comprise a golden copy of sanitized resources that are generated by the resource gateway server network, stored in the gateway server network, or stored in a secure database associated with the managing system. As more resources are received from the production environments, sanitized, and tested, the sanitized resource database may grow in size and diversity in resource types stored within it. This sanitized resource database can be made available to users (e.g., software program testers and the like) for use as safe data in testing environments.

Additionally, in some embodiments, the process 600 includes block 612, where the system receives, from a resource exchange portal, a request for a set of sanitized resources for an application testing environment, where the request comprises a required resource volume and one or more required resource types. Of course, the request may comprise additional requirements including, but not limited to, sub-types of resources (e.g., resource data of duration of life values that are within a particular range), type of environment(s) from which the resources originated from before being sanitized or otherwise processed (e.g., a production environment, a particular production environment, and the like), and the like.

The process 600 may then include block 614, where the system generates, from the sanitized resource database, a provisioned set of resources that comprises the required resource volume and the one or more required resource types. Finally, the process 600 may continue to block 616, where the system seeds the provisioned set of resources to the application testing environment. The computing device system of the user may then begin to perform application tests on the sanitized resource data, requesting additional sanitized resource data when needed. Because the resource data has been thoroughly sanitized of sensitive resources, no sensitive information is available in the testing environment, where data privacy protections may not be as robust as in other environments.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 16/035,064 now U.S. Patent Publication No. 2020/0019489 | INTEGRATED DATA PROVISIONING SYSTEM FOR APPLICATION DEVELOPMENT | Concurrently Herewith |
| 16/035,114 now U.S. Patent Publication No. 2020/0019696 | MONITORING DATA CONSUMPTION IN AN APPLICATION TESTING ENVIRONMENT | Concurrently Herewith |
| 16/035,345 now U.S. Patent Publication No. 2020/0019648 | SYSTEM FOR MONITORING LOWER LEVEL ENVIRONMENT FOR UNSANITIZED DATA | Concurrently Herewith |
| 16/035,162 now U.S. Patent Publication No. 2020/0019729 | SYSTEM FOR PROVISIONING VALIDATED SANITIZED DATA FOR APPLICATION DEVELOPMENT | Concurrently Herewith |

The invention claimed is:

1. A system for providing a holistic and secure resource provisioning gateway, the system comprising:
    a memory device; and
    a processing device operatively coupled to the memory device, wherein the processing device is configured to execute computer-readable program code to:
        receive a plurality of resources from multiple disparate sources, wherein the plurality of resources comprise resources of multiple resource formats;
        divide the plurality of resources into two or more resource blocks;
        transmit each resource block of the two or more resource blocks to a single server of a resource gateway server network such that each server of the resource gateway server network receives a single resource block of the two or more resource blocks that is considered a respective resource block;
        transmit packaged code to each server of the resource gateway server network to process each respective resource block, wherein the packaged code is configured to cause each server of the resource gateway server network to generate and return a processed respective resource block by:
            identifying sensitive resources in the respective resource block;
            sanitizing the sensitive resources in the respective resource block; and returning the processed respective resource block;

receive and store each processed respective resource block from each server of the resource gateway server network in a sanitized resource database;

receive, from a resource exchange portal, a request for a set of sanitized resources for an application testing environment, wherein the request comprises a required resource volume and one or more required resource types;

generate, from the sanitized resource database, a provisioned set of resources that comprises the required resource volume and the one or more required resource types; and seed the provisioned set of resources to the application testing environment.

2. The system of claim 1, wherein identifying the sensitive resources comprises:

identifying a schema associated with a resource file of the respective resource block; and comparing the identified schema to a database of known schema and associated locations of sensitive resources within each known schema to identify locations of the sensitive resources within the schema associated with the resource file of the respective resource block.

3. The system of claim 1, wherein identifying the sensitive resources comprises:

identifying a pattern associated with a resource element of the respective resource block, wherein the pattern is associated with a known type of sensitive resource; and identifying the resource element of the respective resource block as a sensitive resource.

4. The system of claim 1, wherein sanitizing the sensitive resources comprises:

scrambling resource elements of the sensitive resources in a randomized manner within individual columns of the sensitive resources.

5. The system of claim 1, wherein sanitizing the sensitive resources comprises:

replacing at least a portion of individual characters of the sensitive resources.

6. The system of claim 1, wherein sanitizing the sensitive resources comprises:

replacing an entire resource element of the sensitive resources with a randomly generated test resource element that adheres to rules of the replaced entire resource element.

7. The system of claim 1, wherein sanitizing the sensitive resources comprises:

adjusting original numerical values of the sensitive resources to values within a predetermined percentage difference from the original numerical values of the sensitive resources.

8. A computer program product for providing a holistic and secure data provisioning gateway, the computer program product comprising at least one non-transitory computer readable medium comprising computer readable instructions that are executed to:

receive a plurality of data from multiple disparate sources, wherein the plurality of data comprise data of multiple data formats;

divide the plurality of data into two or more data blocks;

transmit each data block of the two or more data blocks to a single server of a data gateway server network such that each server of the data gateway server network receives a single data block of the two or more data blocks that is considered a respective data block;

transmit packaged code to each server of the data gateway server network to process each respective data block, wherein the packaged code is configured to cause each server of the data gateway server network to generate and return a processed respective data block by:

identifying sensitive data in the respective data block;

sanitizing the sensitive data in the respective data block; and returning the processed respective data block;

receive and store each processed respective data block from each server of the data gateway server network in a sanitized data database;

receive, from a data exchange portal, a request for a set of sanitized data for an application testing environment, wherein the request comprises a required data volume and one or more required data types;

generate, from the sanitized data database, a provisioned set of data that comprises the required data volume and the one or more required data types; and seed the provisioned set of data to the application testing environment.

9. The computer program product of claim 8, wherein identifying the sensitive data comprises:

identifying a schema associated with a data file of the respective data block; and comparing the identified schema to a database of known schema and associated locations of sensitive data within each known schema to identify locations of the sensitive data within the schema associated with the data file of the respective data block.

10. The computer program product of claim 8, wherein identifying the sensitive data comprises:

identifying a pattern associated with a data element of the respective data block, wherein the pattern is associated with a known type of sensitive data; and identifying the data element of the respective data block as a sensitive data.

11. The computer program product of claim 8, wherein sanitizing the sensitive data comprises:

scrambling data elements of the sensitive data in a randomized manner within individual columns of the sensitive data.

12. The computer program product of claim 8, wherein sanitizing the sensitive data comprises:

replacing at least a portion of individual characters of the sensitive data.

13. The computer program product of claim 8, wherein sanitizing the sensitive data comprises:

replacing an entire data element of the sensitive data with a randomly generated test data element that adheres to rules of the replaced entire data element.

14. The computer program product of claim 8, wherein sanitizing the sensitive data comprises:

adjusting original numerical values of the sensitive data to values within a predetermined percentage difference from the original numerical values of the sensitive data.

15. A computer implemented method for providing a holistic and secure data provisioning gateway, said computer implemented method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving a plurality of data from multiple disparate sources, wherein the plurality of data comprise data of multiple data formats;

dividing the plurality of data into two or more data blocks;

transmitting each data block of the two or more data blocks to a single server of a data gateway server network such that each server of the data gateway server network receives a single data block of the two or more data blocks that is considered a respective data block;

transmitting packaged code to each server of the data gateway server network to process each respective data block, wherein the packaged code is configured to cause each server of the data gateway server network to generate and return a processed respective data block by:

identifying sensitive data in the respective data block;

sanitizing the sensitive data in the respective data block; and returning the processed respective data block;

receiving and store each processed respective data block from each server of the data gateway server network in a sanitized data database;

receiving, from a data exchange portal, a request for a set of sanitized data for an application testing environment, wherein the request comprises a required data volume and one or more required data types;

generating, from the sanitized data database, a provisioned set of data that comprises the required data volume and the one or more required data types; and seeding the provisioned set of data to the application testing environment.

16. The computer implemented method of claim 15, wherein identifying the sensitive data comprises:

identifying a schema associated with a data file of the respective data block; and comparing the identified schema to a database of known schema and associated locations of sensitive data within each known schema to identify locations of the sensitive data within the schema associated with the data file of the respective data block.

17. The computer implemented method of claim 15, wherein identifying the sensitive data comprises:

identifying a pattern associated with a data element of the respective data block, wherein the pattern is associated with a known type of sensitive data; and identifying the data element of the respective data block as a sensitive data.

18. The computer implemented method of claim 15, wherein sanitizing the sensitive data comprises:

scrambling data elements of the sensitive data in a randomized manner within individual columns of the sensitive data.

19. The computer implemented method of claim 15, wherein sanitizing the sensitive data comprises:

replacing at least a portion of individual characters of the sensitive data.

20. The computer implemented method of claim 15, wherein sanitizing the sensitive data comprises:

replacing an entire data element of the sensitive data with a randomly generated test data element that adheres to rules of the replaced entire data element; or adjusting original numerical values of the sensitive data to values within a predetermined percentage difference from the original numerical values of the sensitive data.

* * * * *